United States Patent
Hara et al.

(10) Patent No.: US 8,318,226 B2
(45) Date of Patent: Nov. 27, 2012

(54) MILK-TYPE FOOD AND DRINK PACKED IN TRANSPARENT CONTAINER AND PROCESS FOR PRODUCING THE SAME

(75) Inventors: Tomokazu Hara, Odawara (JP); Tomoyasu Taguchi, Odawara (JP); Yasushi Kubota, Tokyo (JP)

(73) Assignee: Meiji Co., Ltd., Tokyo (JP)

( * ) Notice: Subject to any disclaimer, the term of this patent is extended or adjusted under 35 U.S.C. 154(b) by 813 days.

(21) Appl. No.: 12/094,432

(22) PCT Filed: Nov. 20, 2006

(86) PCT No.: PCT/JP2006/323131
§ 371 (c)(1),
(2), (4) Date: May 21, 2008

(87) PCT Pub. No.: WO2007/058350
PCT Pub. Date: May 24, 2007

(65) Prior Publication Data
US 2009/0238926 A1    Sep. 24, 2009

(30) Foreign Application Priority Data
Nov. 21, 2005  (JP) .................................. 2005-335805

(51) Int. Cl.
*B65D 81/34*    (2006.01)
(52) U.S. Cl. ......... 426/107; 426/130; 426/106; 426/392
(58) Field of Classification Search .................. 426/107, 426/106, 130, 392; 428/333
See application file for complete search history.

(56) References Cited

U.S. PATENT DOCUMENTS

| | | | | |
|---|---|---|---|---|
| 2,643,982 A  * | 6/1953 | Riley | ............................. | 252/589 |
| 3,291,621 A  * | 12/1966 | Hagedorn | ........................ | 501/66 |
| 4,139,517 A  * | 2/1979 | Zaganiacz | ..................... | 524/611 |
| 6,447,828 B1 * | 9/2002 | Kamiya et al. | ................ | 426/474 |
| 7,713,563 B2 * | 5/2010 | Kubota et al. | ................. | 426/580 |
| 2004/0195141 A1* | 10/2004 | Adriansens et al. | ....... | 206/524.1 |

FOREIGN PATENT DOCUMENTS

| | | |
|---|---|---|
| JP | 56-38071 U | 4/1981 |
| JP | 63-79737 A | 4/1988 |

(Continued)

OTHER PUBLICATIONS

"Newest Soft Drinks", Editing Committee for Newest Soft Drinks, Sep. 2003, pp. 365-371 and 515-520, K.K. Korin, Japan.

(Continued)

*Primary Examiner* — Drew Becker
*Assistant Examiner* — Luana Z Long
(74) *Attorney, Agent, or Firm* — Sughrue Mion, PLLC

(57) ABSTRACT

An object of the present invention is to provide a milk-type food and drink including cow's milk packed in a transparent container such as a PET bottle, which does not generate off-flavor due to photoinduction even when the milk-type food and drink is a store-displaying commercial product which is apt to come under the influence of sunlight and fluorescent light. The invention relates to a milk-type food and drink packed in a transparent container which substantially shields light in the wavelength region of 550 to 720 nm, and a process for producing a milk-type food and drink, which comprises packing a milk-type food and drink in a transparent container which substantially shields light in the wavelength region of 550 to 720 nm.

13 Claims, 1 Drawing Sheet

FOREIGN PATENT DOCUMENTS

| | | |
|---|---|---|
| JP | 8-283495 A | 10/1996 |
| JP | 10-84866 A | 4/1998 |
| JP | 10-295341 A | 11/1998 |
| JP | 2000-228952 A | 8/2000 |
| JP | 2000-280394 A | 10/2000 |
| JP | 2001-158478 A | 6/2001 |
| JP | 2002-65154 A | 3/2002 |
| JP | 2002-262769 A | 9/2002 |
| JP | 2004-256143 A | 9/2004 |
| JP | 2004-284316 A | 10/2004 |
| JP | 2005-178850 A | 7/2005 |
| JP | 2005-523845 A | 8/2005 |
| WO | WO 2004/052113 * | 6/2004 |

OTHER PUBLICATIONS

"Commentary to Test Methods for Milk Products", Pharmaceutical Society of Japan, Jun. 1999, pp. 351, 1st Printing, 2nd Edition, Kanehara Shuppan K.K., Japan.

"JIS Handbook, 27: Plastics, II (Materials)", Japan Standards Association, Jan. 2005, pp. 245-253, 1st Printing, 1st Edition.

* cited by examiner

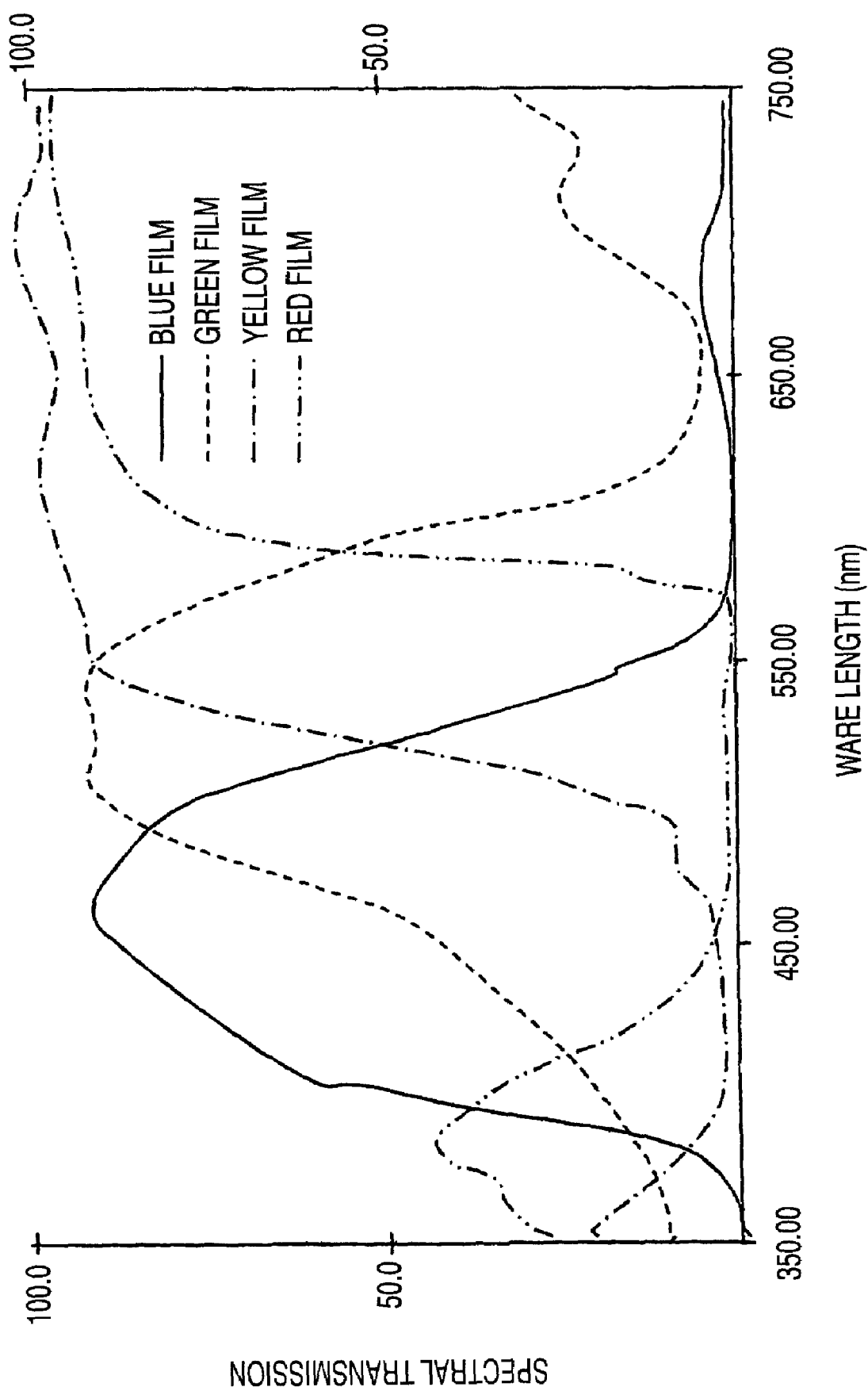

MILK-TYPE FOOD AND DRINK PACKED IN TRANSPARENT CONTAINER AND PROCESS FOR PRODUCING THE SAME

TECHNICAL FIELD

The present invention relates to a milk-type food and drink packed in a transparent container, in particular, a milk-type food and drink wherein a milk drink such as cow's milk is packed in a transparent container, which is capable of being displayed at the store.

BACKGROUND ART

Recently, with diversification of consumer's dietary habits, a wide variety of drinks have been required and thus a variety of commercial product groups have been developed. Among them, milk-type foods and drinks (foods and drinks such as milk, processed milk, milk drinks, lactic acid bacteria drinks, milk-blended drinks; hereinafter also referred to as "cow's milk etc. for drinking and milk products") have been considered to be promising also in the future as health-promoting drinks from the viewpoint of various nutrients intrinsically possessed by cow's milk etc.

In general, because of no exposure to light for a long time in distribution routes, cow's milk for door-to-door delivery can be provided after it is packed in a transparent bottle, but the cowls milk etc. for drinking and milk products displayed and sold at the store are usually provided after they are packed in light-shielding paper containers or plastic containers. In such cow's milk etc. for drinking and milk products, milk components such as milk fat contained therein have undergone oxidation through the exposure to light such as sunlight and fluorescent light when they are displayed at the store, and thereby, abnormal smell referred to as off-flavor is sometimes generated, which is different from the original smell. In order to prevent the generation of the off-flavor, the cow's milk etc. for drinking and milk products are packed in containers possessing a light-shielding property and then displayed and sold.

The off-flavor generated from cow's milk etc. for drinking and milk products is mainly attributable to photooxidation and milk components such as milk fat. Main components of the off-flavor are certain kinds of aldehydes and the like and they are not problematic with regard to quality of the product. However, the flavor is much different from the original one and thus the commercial value thereof is remarkably lowered.

On the other hand, recently, as one of various measures for enhancing the consumption of cow's milk etc. for drinking and milk products, a variety of containers have been investigated. Among them, polyethylene terephthalate containers, so-called PET bottles are frequently used as one factor for leading the drink market because of their recycling efficiency, re-capping ability, high barrier property, and the like. In particular, since the content can be visually checked, consumers can also obtain the sense of relief. Therefore, use of these transparent PET bottles for the cow's milk etc. for drinking and milk products is considered to be promising but the aforementioned problem of off-flavor should be solved as an essential problem.

As solutions thereof, various measures have been investigated. For example, for packaging products such as cow's milk, quality deterioration of the products is prevented by molding a container with adding or laminating a specific pigment composition to enhance a light-shielding property (see, Patent Documents 1, 2, and 3, and the like).

As other solutions, there have been proposed a method of adding a certain additive to milk products and a method of solving the problem by performing a certain treatment on milk products. For example, there may be mentioned a method of decreasing the formation of unpleasant smell in milk products due to photooxidation by adding ascorbic acid to milk products such as cow's milk (Patent Document 4), a method of preventing the generation of off-flavor by adding vitamin E to milk-mixed specialized drinks (Patent Document 5), a method of preventing the generation of off-flavor due to photoinduction by subjecting milk drinks/foods to a heat treatment under specific conditions (Patent Document 6), and the like methods.

However, with regard to the light-shielding container adopted in the above conventional art, the content substantially cannot be visually checked from the outside, unlike so-called transparent containers. Therefore, the above container deviates from the primary object, to be a transparent container, and hence cannot be employed. Moreover, the conventional technology in which an additional additive is used cannot be applied since it is forbidden to use any additive in cow's milk for drinking. Furthermore, in the case that an additive is applied to cow's milk etc. for drinking and milk products, the flavor thereof may be impaired and also the production process and product costs are influenced.

Patent Document 1: JP-A-8-283495
Patent Document 2: JP-A-2005-523845
Patent Document 3: JP-A-2005-178850
Patent Document 4: JP-A-10-844866
Patent Document 5: JP-A-2000-228952
Patent Document 6: JP-A-2002-262769

DISCLOSURE OF THE INVENTION

Accordingly, in the invention, an object is to provide a milk-type food and drink including cow's milk for drinking, packed in a transparent container such as a PET bottle, with small generation of off-flavor due to photoinduction even when the milk-type food and drink is a store-displayed commercial product which is apt to come under the influence of sunlight and fluorescent light.

As a result of extensive studies for solving the above problems, the present inventors have found that a transparent container such as a PET bottle, which is hitherto difficult to use, can be used for a milk-type food and drink by a simple and convenient means and thus have accomplished the invention.

Namely, the invention relates to the following (1) to (12).

(1) A milk-type food and drink which is packed in a transparent container, wherein the transparent container substantially shields light in the wavelength region of 550 to 720 nm.

(2) The milk-type food and drink according to (1), wherein the transparent container is constituted of a light-shielding container material.

(3) The milk-type food and drink according to (1), wherein the transparent container comprises a light-shielding coating layer formed by applying a coating material onto the transparent container.

(4) The milk-type food and drink according to (1), wherein the transparent container comprises a light-shielding film.

(5) The milk-type food and drink according to any one of (1) to (4), wherein the transparent container has a light-shielding ratio of 50% or more in the wavelength region of 550 to 720 nm.

(6) The milk-type food and drink according to any one of (1) to (5), which has a dissolved oxygen concentration of 8 ppm or less.

(7) The milk-type food and drink according to any one of (2) to (6), wherein the transparent container and/or light-shielding film is constituted of at least one material selected from the group consisting of glass, polyethylene, polypropylene, polyethylene terephthalate, polyethylene naphthalate, an ethylene/1-alkene copolymer, nylon, polystyrene, and vinyl chloride.

(8) The milk-type food and drink according to (7), wherein the material is at least one of polyethylene terephthalate and polyethylene naphthalate.

(9) A process for producing a milk-type food and drink, which comprises packing a milk-type food and drink in a transparent container which substantially shields light in the wavelength region of 550 to 720 nm.

(10) The process for producing a milk-type food and drink according to (9), which further comprises reducing a dissolved oxygen concentration of the milk-type food and drink to 8 ppm or less.

(11) The process for producing a milk-type food and drink according to (9) or (10), wherein the transparent container is constituted of at least one material selected from the group consisting of glass, polyethylene, polypropylene, polyethylene terephthalate, polyethylene naphthalate, an ethylene/1-alkene copolymer, nylon, polystyrene, and vinyl chloride.

(12) The process for producing a milk-type food and drink according to (11), wherein the material is at least one of polyethylene terephthalate and polyethylene naphthalate.

According to the invention, the above problems can be solved by providing a milk-type food and drink, which is packed in a transparent container which substantially shields light in the wavelength region of 550 to 720 nm.

In the above milk-type food and drink, the transparent container is preferably constituted of a light-shielding container material or the above transparent container preferably includes a light-shielding layer formed by applying a coating material onto the transparent container or a light-shielding film.

In the above milk-type food and drink, the transparent container preferably has a shielding ratio of 50% or more in the above wavelength region.

In the above milk-type food and drink, the milk-type food and drink preferably has a dissolved oxygen concentration of 8 ppm or less.

In the above milk-type food and drink, the transparent container material and/or light-shielding film is preferably constituted of at least one material selected from the group consisting of glass, polyethylene, polypropylene, polyethylene terephthalate, polyethylene naphthalate, an ethylene/1-alkene copolymer, nylon, polystyrene, and vinyl chloride. Moreover, as the above material, polyethylene terephthalate, polyethylene naphthalate or both of them is particularly preferably employed.

Furthermore, according to the invention, there is provided a process for producing a milk-type food and drink, which comprises packing a milk-type food and drink in a transparent container which substantially shields light in the wavelength region of 550 to 720 nm.

In the above production process, it is preferable that the process further comprises a step of reducing the dissolved oxygen concentration of the milk-type food and drink, which is a content, to 8 ppm or less.

Moreover, in the above production process, the transparent container is preferably constituted of a material selected from the group consisting of glass, polyethylene, polypropylene, polyethylene terephthalate, polyethylene naphthalate, an ethylene/1-alkene copolymer, nylon, polystyrene, and vinyl chloride, and the above material is more preferably polyethylene terephthalate, polyethylene naphthalate or both of them.

According to the invention, even when the milk-type food and drink is a store-displayed commercial product which is apt to come under the influence of sunlight and fluorescent light, it is possible to suppress the generation of off-flavor due to photoinduction. Furthermore, it is possible to directly visually check the milk-type food and drink, which is the content, since it is packed in a transparent container such as a PET bottle.

BRIEF DESCRIPTION OF DRAWINGS

FIG. 1 is a graph showing spectral transmitting spectra of the light-shielding color films used in Experimental Example 2.

BEST MODE FOR CARRYING OUT THE INVENTION

The following will describe the invention in detail but the invention is not limited to individual modes described below.

The milk-type food and drink including cow's milk in the invention is a food and drink such as milk, processed milk, a milk drink, a lactic acid bacteria drink, or a milk-blended drink and is namely a milk-blended food and drink. Examples of the milk-type food and drink is not limited thereto and include raw milk such as cow's milk and goat milk; processed milk such as powdered skim milk, whole powdered milk, infant formula, and concentrated milk; milk-derived products such as fresh cream, ice creams, cream powder, fermented milk, and lactic acid bacteria drink; and foods such as white sauce, milk pudding, and cream soup.

In this connection, as the content of the milk-type food and drink in the invention, any liquid matter and solid matter may be employed and the solid matter includes a powder or solid body.

Into the milk-type food and drink in the invention, other food components commonly used such as water, proteins, various carbohydrates, vitamins, minerals, organic acids, organic bases, emulsifiers, thickening agents, sweeteners, acidifiers, and fruit juices may be suitably blended.

In the invention, as the transparent container, a substantially transparent container made of glass or a plastic is used. The term "substantially transparent" used herein means that the content can be directly viewed through transmission of light having a wavelength out of the wavelength range where light is shielded in the invention.

Moreover, the transparent container in the invention is not necessarily transparent as a whole and a partially transparent container is also included in the invention. Examples thereof include a container in which a label/printed part for indicating contents is opaque or translucent and the other part is transparent, a container in which transparent and opaque parts are differently combined at two or more positions in a specific design, and an opaque container having only a transparent part having such a size of a viewing window, and thus the transparent region thereof is not limited.

Furthermore, the shape of the container is not particularly limited and may generally be a bottle shape, cup shape, glass shape, and the like. In addition, as the form for packaging, forms suited to various distribution processes may be employed. For example, there may be included forms such as aseptically filled products, filled products in a state capable of being stored under refrigeration, and containers for freezing, but the form is not limited thereto.

As the material for forming the container in the invention, materials to be used in a general container for food and drink can be applied. There may be used glass or a synthetic resin such as polyethylene, polypropylene, polyethylene terephthalate, polyethylene naphthalate, an ethylene/1-alkene copolymer, nylon, polystyrene, or vinyl chloride but the material is not limited thereto. In the invention, in view of cost, transportability, moldability, strength, and the like, a synthetic resin is preferably used and polyethylene terephthalate (PET) and polyethylene naphthalate (PEN) which are also excellent in transparency are particularly preferred. Moreover, in the invention, it is possible to use two or more kinds of these materials in combination, according to the necessity.

In the invention, a liquid containing a milk component such as cow's milk is packed in a transparent container. In this regard, the transparent container preferably shields light having a wavelength in a specific range. Preferably, it substantially shields light in the wavelength region of 550 to 720 nm. The term "substantially shield" means that the container shield light to such an extent that the effect(s) of the invention is thoroughly achieved. In the invention, the container has a shielding ratio of 50% or more, preferably 75% or more, more preferably 90% or more in the above wavelength region. Thereby, the generation of aldehydes can be particularly suppressed and hence the case is preferred.

The method for imparting light-shielding ability to the container is not limited but there may be mentioned a method of forming a container using a light-shielding container material in which a light-shielding pigment or dye or the like is added and kneaded into a container material (e.g., a glass material or a resin material), a method of forming a light-shielding coating layer on a transparent container by applying a coating material containing a light-shielding pigment or dye on a predetermined region after the formation of the transparent container, a method of laminating a light-shielding film colored with a light-shielding pigment or dye after the formation of a transparent container, and the like methods.

As the above light-shielding pigment or dye, one of those used in usual applications for food and drink containers may be used or a combination thereof may be used, depending on conditions.

In the invention, in at least any one stage before or after packing a liquid containing milk components in a transparent container which shields light in a predetermined wavelength region as mentioned above, it is preferable to reduce the dissolved oxygen concentration in the content thereof.

It is considered that the photodegradation of the liquid containing milk components occurs, for example, in the case of cow's milk, through interaction between lipids, proteins, riboflavin, and enzymes. The riboflavin excited by light catalyzes the transformation of methionine into methional. Oxygen in the cow's milk is converted into active oxygen by the action of the methional and the active oxygen acts on the oxidation of the milk components. In addition, there is a possibility of the formation of active oxygen from oxygen by another mechanism. Accordingly, it is considered that decrease of oxygen may also decrease active oxygen and suppress the oxidation of the milk components induced by light.

The method for removing oxygen is not limited but there may be used a method of substituting dissolved oxygen with a gas by directly bubbling the gas into the content before or after packing the content substance (a step so-called bubbling), a method of substituting dissolved oxygen with a gas by spraying the content substance in an inert gas atmosphere, a method of removing dissolved oxygen by reducing pressure, a membrane-separation method using an oxygen-removing membrane, or the like method. In this regard, final dissolved oxygen concentration is 8 ppm or less, preferably 5 ppm or less, more preferably 2 ppm or less.

The inert gas to be used at this time is a gas including a nitrogen gas, an argon gas, or a helium gas, and use of the nitrogen gas is preferable for the oxygen removing application in view of easy availability, cost, and the like.

In the case that the membrane separation method is conducted as a method of reducing the dissolved oxygen concentration, a hollow fiber membrane (MHF304KM manufactured by Mitsubishi Rayon Co., Ltd., etc.) can be used as the oxygen-removing membrane. The membrane may be used with reference to the conventional method for using the membrane.

The steps for producing the milk-type food and drink according to the invention other than the steps described above may be methods generally used in the production steps of milk drinks/milk products including cow's milk.

EXAMPLES

The following will describe the invention with reference to Examples but the invention is not limited thereto.

Experimental Example 1

Irradiation Experiments with LED's Having Various Color Tones

A milk (240 ml) having a fat-free milk solid content of 8.3% or more and a milk fat content of 3.5% or more was packed in a transparent PET bottle having an inner volume of 300 ml (80% or more of light was transmitted over all wavelength region) to prepare plurality of samples. Individual samples were irradiated with light for 3 days by means of an LED irradiator (Shimatec SFS200 series) using various LED light sources. In this connection, at irradiation, it was irradiated with regulating illumination intensity so that radiation intensity at very long wavelengths became 7 $\mu W/cm^2$ (corresponding to fluorescent light intensity of 2000 lux).

Thereafter, after solid-phase microextraction of head space was performed using 10 ml of each sample (extraction conditions: 60° C., 40 minutes, solid-phase microfiber: SPME fiber 85 $\mu m$ carboxen/PDMS Stable Flex, manufactured by SUPELCO, internal standard: methyl isobutyl ketone), concentrations of pentanal and hexanal which were oxidation index substances of the milk components were measured by means of a GC/MS analyzing apparatus (MSD-5973, manufactured by Hewlett Packard, a column for GC: CP-WAX: manufactured by GL Sciences Inc.). The results obtained are shown in Table 1.

Moreover, on these samples, a sensory test was performed by five special panelists trained for flavor discriminations of milk. In the sensory test, each sample on the third day of irradiation was tasted and the flavor was compared and ranked on the basis of a control and of the sample that was evaluated as the worst one. The ranking is as follows.

A: The sample has usual smell of cow's milk and is not particularly problematic.

B: The sample has slight smell but the smell is not particularly worrying one, and thus the sample is not problematic.

C: The sample has somewhat worrying abnormal smell and is problematic in some cases.

D: The sample has serious abnormal smell and is somewhat unsuitable for drink, and thus the sample is problematic.

E: The sample has rather strong abnormal smell and is completely unsuitable for drink, and thus the sample is problematic.

These results are also shown in Table 1.

In this connection, the color tone, maximum radiation-intensity wavelength, wavelength range of LED's used in the experiments are as follows.

White LED: 465 nm, 400 to 800 nm
Blue LED: 475 nm, 420 to 550 nm (corresponding to the invention)
Green LED: 527 nm, 430 to 600 nm
Orange LED: 595 nm, 550 to 640 nm
Red LED: 656 nm, 590 to 700 nm

TABLE 1

| Index substance (μg/L) | Reference standard Light-shielding | Example 1 Blue LED | Comparative Example 1 Green LED | Comparative Example 2 Orange LED | Comparative Example 3 Red LED |
|---|---|---|---|---|---|
| Pentanal | 0 | 4 | 20 | 24 | 28 |
| Hexanal | 2 | 7 | 17 | 16 | 22 |
| Sensory evaluation | A | B | C | E | E |

As is apparent from the experimental results shown in Table 1, in Example 1 where light in a wavelength region shielded in the invention was not irradiated (almost equivalent experiment to the light-shielded case), the concentrations of pentanal and hexanal which are indices of milk component oxidation which is the cause of abnormal smell are remarkably low even after 3 days of irradiation as compared with the cases of Comparative Examples and thus generation thereof is suppressed. Moreover, this fact could be confirmed also by the sensory test.

Experimental Example 2

Light-Irradiation Experiment with Various Color Film-Fitted Containers

A milk (240 ml) the same as in Experimental Example 1 was packed in a transparent PET bottle having an inner volume of 300 ml to prepare plurality of samples. In this regard, the transparent PET bottle was fitted with one of various color films (light shielding over whole wavelength range, blue, green, yellow, red) to shield light in a specific wavelength region. FIG. 1 shows spectral transmitting spectra of the color films used at this time. These cow's milks packed in PET bottles were irradiated with a fluorescent light (FL40SNK, manufactured by Prince Electric Co., Ltd.) for 5 days. In this connection, the irradiation was conducted at an illumination intensity of 2000 lux at this time.

After irradiation, measurement of concentrations of pentanal and hexanal and sensory test were carried out in the same manner as in Experimental Example 1. The results obtained are summarized in Table 2. In addition, visibility of the content, i.e., whether the content can be viewed as is desired for a store-displayed commercial product, was visually evaluated. In this connection, the visibility was based on the following ranking.
A: Content can be visually checked.
B: Content cannot be visually checked.

As is apparent from the experimental results shown in Table 2, in Example 2 where light in a wavelength region to be shielded in the invention was shielded, it is realized that the concentrations of pentanal and hexanal as oxidation-index substances of milk components which are causes of abnormal smell are remarkably low even after 5 days of irradiation as compared with the cases of Comparative Examples and thus generation thereof is suppressed. Moreover, this fact could be confirmed also by the sensory test. Furthermore, it is realized that the content can be visually checked and thus the commercial value increases.

Experimental Example 3

LED Irradiation+Oxygen-Removing Treatment

As Example 3, a sample was prepared in the same manner as in Experimental Example 1 except that oxygen-removing treatment was also conducted. In this connection, as the oxygen-removing treatment, bubbling was conducted for 2 hours using a nitrogen gas to reduce dissolved oxygen content to 2 ppm or less. Thereafter, light was irradiated with the irradiation apparatus and under the irradiation conditions the same as in Example 1 in Experimental Example 1. In this connection, the irradiation time was 5 days in order to more clearly confirm the difference.

Incidentally, as a control for comparison, Comparative Example 7 was used wherein operation was conducted under the same conditions as in Example 3 except that the oxygen-removing treatment was not conducted.

After irradiation, measurement of concentrations of pentanal and hexanal and the sensory test were carried out in the same manner as in Experimental Example 1. The results obtained were summarized in Table 3.

TABLE 3

| Index substance (μg/L) | Example 3 With oxygen-removing treatment | Comparative Example 7 With no oxygen-removing treatment |
|---|---|---|
| Pentanal | 0 | 10 |
| Hexanal | 4 | 34 |
| Sensory evaluation | B | C |

TABLE 2

| Index substance (μg/L) | Reference standard Light-shielding | Reference Example Transparent film | Example 2 Blue film | Comparative Example 4 Green film | Comparative Example 5 Yellow film | Comparative Example 6 Red film |
|---|---|---|---|---|---|---|
| Pentanal | 0 | 11 | 8 | 10 | 27 | 22 |
| Hexanal | 4 | 13 | 12 | 8 | 18 | 14 |
| Sensory evaluation | A | D | C | D | E | E |
| Transparency | B | A | A | A | A | A |

As is apparent from the experimental results shown in Table 3, in the sample where light in the wavelength region shielded in the invention was not irradiated and the dissolved oxygen concentration was lowered, it is realized that the concentrations of pentanal and hexanal as oxidation-index substances of milk components which are causes of abnormal smell are remarkably low as compared with the case of comparative one and thus generation thereof is suppressed. Moreover, this fact could be confirmed also by the sensory test.

Experimental Example 4

Color Film-Fitted Container+Oxygen-Removing Treatment

As Example 4, a sample was prepared in the same manner as in Experimental Example 2 except that oxygen-removing treatment was also conducted. In this connection, as the oxygen-removing treatment, bubbling was conducted for 2 hours using a nitrogen gas to lower dissolved oxygen content to 2 ppm or less. Thereafter, light was irradiated for 5 days with the irradiation apparatus and under the irradiation conditions the same as in Example 2 in Experimental Example 2 where light was shielded with a blue film.

Incidentally, as a control for comparison, Comparative Example 8 was used wherein operation is conducted under the same conditions as in Example 4 except that the oxygen-removing treatment was not conducted.

After irradiation, measurement of concentrations of pentanal and hexanal and the sensory test were carried out in the same manner as in Experimental Example 2. The results obtained were summarized in Table 4.

TABLE 4

| Index substance (μg/L) | Example 4 With oxygen-removing treatment | Comparative Example 8 With no oxygen-removing treatment |
|---|---|---|
| Pentanal | 3 | 8 |
| Hexanal | 5 | 12 |
| Sensory evaluation | B | C |

As is apparent from the experimental results shown in Table 4, in the sample where light in a wavelength region to be shielded in the invention was shielded and the dissolved oxygen concentration was lowered, it is realized that the concentrations of pentanal and hexanal, index substances of milk components oxidation which is a cause of abnormal smell are remarkably low even after 5 days of irradiation as compared with the case of comparative one and thus generation thereof is suppressed. Moreover, this fact could be confirmed also by the sensory test.

While the invention has been described in detail and with reference to specific embodiments thereof, it will be apparent to one skilled in the art that various changes and modifications can be made therein without departing from the scope thereof.

This application is based on Japanese patent application No. 2005-335805 filed Nov. 21, 2005, the entire contents thereof being hereby incorporated by reference.

Further, all references cited herein are incorporated in their entireties.

INDUSTRIAL APPLICABILITY

According to the invention, a milk-type food and drink including cow's milk packed in a transparent container such as a PET bottle, which does not generate off-flavor due to photoinduction even when it is a store-displayed product which is apt to come under the influence of sunlight and fluorescent light, can be provided. Particularly, since the content of the commercial product can be visually checked and flavor is not impaired even upon usual display at the store, high-value added commercial products can be provided for consumers and thus a large economic efficiency is obtained.

The invention claimed is:

1. A milk-type food and drink which is packed in a transparent container and has a dissolved oxygen concentration of 8 ppm or less, wherein the transparent container substantially shields light in the wavelength region of 550 to 720 nm, and the transparent container has a light-shielding ratio of 90% or more in the wavelength region of 550 to 720 nm.

2. The milk-type food and drink according to claim 1, wherein the transparent container is constituted of a light-shielding container material.

3. The milk-type food and drink according to claim 2, wherein the transparent container is constituted of at least one material selected from the group consisting of glass, polyethylene, polypropylene, polyethylene terephthalate, polyethylene naphthalate, an ethylene/1-alkene copolymer, nylon, polystyrene, and vinyl chloride.

4. The milk-type food and drink according to claim 3, wherein the material is at least one of polyethylene terephthalate and polyethylene naphthalate.

5. The milk-type food and drink according to claim 1, wherein the transparent container comprises a light-shielding coating layer formed by applying a coating material onto the transparent container.

6. The milk-type food and drink according to claim 5, wherein the transparent container is constituted of at least one material selected from the group consisting of glass, polyethylene, polypropylene, polyethylene terephthalate, polyethylene naphthalate, an ethylene/1-alkene copolymer, nylon, polystyrene, and vinyl chloride.

7. The milk-type food and drink according to claim 6, wherein the material is at least one of polyethylene terephthalate and polyethylene naphthalate.

8. The milk-type food and drink according to claim 1, wherein the transparent container comprises a light-shielding film.

9. The milk-type food and drink according to claim 8, wherein the transparent container and/or the light-shielding film is constituted of at least one material selected from the group consisting of glass, polyethylene, polypropylene, polyethylene terephthalate, polyethylene naphthalate, an ethylene/1-alkene copolymer, nylon, polystyrene, and vinyl chloride.

10. The milk-type food and drink according to claim 9, wherein the material is at least one of polyethylene terephthalate and polyethylene naphthalate.

11. A process for producing a milk-type food and drink, which comprises packing a milk-type food and drink in a transparent container which substantially shields light in the wavelength region of 550 to 720 nm and reducing the dissolved oxygen concentration in the milk-type food and drink to 8 ppm or less,
  wherein the transparent container has a light-shielding ratio of 90% or more in the wavelength region of 550 to 720 nm.

12. The process for producing a milk-type food and drink according to claim 11, wherein the transparent container is constituted of at least one material selected from the group consisting of glass, polyethylene, polypropylene, polyethylene terephthalate, polyethylene naphthalate, an ethylene/1-alkene copolymer, nylon, polystyrene, and vinyl chloride.

13. The process for producing a milk-type food and drink according to claim 12, wherein the material is at least one of polyethylene terephthalate and polyethylene naphthalate.

* * * * *